United States Patent [19]

Neder

[11] 3,885,840

[45] May 27, 1975

[54] CONNECTING LINK FOR THE RACES OF BALL BEARINGS

[75] Inventor: Günter Neder, Schweinfurt, Germany

[73] Assignee: SKF Industrial Trading and Development Company, B.V., Amsterdam, Netherlands

[22] Filed: Mar. 5, 1974

[21] Appl. No.: 448,264

[30] Foreign Application Priority Data
Mar. 20, 1973 Germany.............................. 7310449

[52] U.S. Cl.............................. 308/184 R; 308/236
[51] Int. Cl...... F16c 27/06; F16c 1/24; F16c 33/78
[58] Field of Search................. 308/236, 184 R, 227

[56] References Cited
UNITED STATES PATENTS

| | | |
|---|---|---|
| 1,699,450 | 1/1929 | Rhoda................................ 308/236 |
| 2,149,349 | 3/1939 | Kilian............................... 308/184 R |
| 2,239,154 | 4/1941 | Keane................................. 308/236 |
| 2,551,503 | 5/1951 | Needham............................. 308/236 |
| 3,741,361 | 6/1973 | Brandenstein....................... 308/236 |
| 3,804,478 | 4/1974 | Andree.............................. 308/227 |
| 3,805,934 | 4/1974 | Labadie............................. 308/184 |

Primary Examiner—Lloyd L. King
Attorney, Agent, or Firm—Murray Schaffer

[57] ABSTRACT

A ball bearing assembly for journaling steering column members having an outer and an inner ring inserted one within the other. The rings define angular bearing race surfaces for a plurality of ball bearings. One of the rings is provided with a plurality of holes spaced about its circumference. An annular elastic member is located on the surface of this ring. The elastic member is provided with lugs extending through the holes adjacent the end of the other race ring. In this manner an interconnection between the race ring is resiliently formed.

9 Claims, 2 Drawing Figures

CONNECTING LINK FOR THE RACES OF BALL BEARINGS

BACKGROUND OF THE INVENTION

The present invention relates to a ball bearing assembly especially adapted for journaling steering column members, and in particular to a bearing having improved means for removably connecting the race members.

In general bearing assemblies of this type comprise an outer and inner race ring loosely inserted one within the other and have angular bearing race surfaces between which a plurality of balls are located. The race rings are adapted to be relatively rotatable as well as to have a degree of axial resilient movement with respect to each other. A resilient connection for such bearings is shown in German Pat. No. 1,259,148 where an elastic annular disc in the form of a truncated cone is provided. The cone is clamped between the outer race and a plurality of lugs which are radially directed outwards from a spring clamping sleeve. The spring clamping sleeve is closely gripped and secured along the inner surface of the inner sleeve and at its free end is formed with radially resilient tabs on which are arranged the lugs, at an axial distance from the races. It will be appreciated that the connecting device shown in this German patent is rather complex and while it provides a resilient connection it does not provide a readily disconnectible or removable connection.

It is the object of the present invention to provide a ball bearing assembly having a readily disconnectible or removable connection between the inner and outer race rings.

It is a further object of the present invention to provide a bearing assembly in which the inner and outer race rings are held together by a simple but highly effective and reliable resilient connecting device.

It is a further object of the present invention to provide a bearing assembly of the type described in which the inner and outer race rings may be joined together by the use of a simple snap joint mechanism.

It is another object of the present invention to provide a bearing assembly of the type described having a resilient removable connection between the outer and inner race rings which is simultaneously capable of absorbing impacts and bearing loads during operation.

The foregoing objects, other objects and numerous advantages of the present invention will be clearly observed from the following disclosure.

SUMMARY OF THE INVENTION

According to the present invention a ball bearing assembly for journaling steering column members is provided comprising an outer ring and an inner ring inserted therein. The rings define angular bearing race surfaces between which a plurality of ball bearings are located. One of the rings is provided with a plurality of holes spaced about its circumference. An annular elastic member is located on the surface of this ring and is provided with lugs extending through the holes. The lugs extend adjacent to the end of the other race ring thereby connecting the rings together. According to the invention the lugs of the elastic annular member pass through the holes or recesses so that they protrude into the zone or area of the end surface of the opposite ball bearing at a point facing away from the track or bearing race surface.

The lugs protrude only to such an extent as to enable the race rings to be operatively connected with each other but to provide a degree of resilient movement between them. Furthermore, the lugs protrude only to such an extent that the race rings may be easily connected or disconnected by merely snapping the rings together allowing the edge of one ring to resiliently snap over the lugs. Thus a more simple and economical arrangement is provided than known heretofore.

The annular elastic member and the lugs are preferably integrally molded. They may be molded in situ about the ring on which they are placed or they may be premolded and then itself snapped over the ring.

Further, the bearing assembly of the present invention is provided with an elastic or resilient jacket covering the race ring. This elastic jacket makes it possible for the bearing assembly to absorb impacts occurring during the operation of the motor vehicle in which the assembly is installed so that such impacts will not be transmitted to the bearing members itself. Thus, the elastic annular member has a multiple function. On the one hand it serves for the absorption of impacts while on the other hand it forms the connecting member between the inner and outer race rings.

Another advantage of the present invention is that the annular member with its extending lugs permits the assembly of the bearing at the factory and thereby enables the assembly to be packaged and transported in its correct position and without fear of loss of any of the parts.

Preferably the annular elastic pad is made from suitable material such as thermal or thermosetting plastic and/or rubber. In one form of the invention the holes in the race ring are circular although the exact shape of the holes is not critical. It is furthermore an advantage according to the present invention to provide the ends of the lugs extending through the holes in the form of enlarged heads such as a rivet head so that their area of cross section is greater than the inner surface of the recess. In this manner the inadvertent removal of the annular elastic member from its race ring will not occur.

Full details of the present invention are given in the following disclosure and are illustrated in the accompanying drawings.

DESCRIPTION OF THE INVENTION

Figure 1:
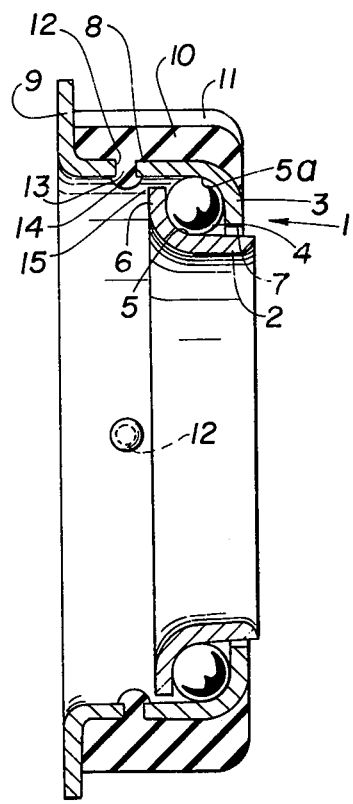
FIG. 1 is an axial sectional view through a steering column bearing assembly constructed according to the present invention.

As seen in FIG. 1 the ball bearing assembly generally depicted by the numeral 1 comprises an inner race ring 2 and an outer race ring 3 between which a plurality of ball rolling elements 4 are located. The inner race ring is provided with a bearing race surface 5 opposed to a similar bearing race surface 5a formed in the outer race ring. The race surfaces 5 and 5a are provided by bending the generally cylindrical inner race ring 2 at one end 6 radially toward the outer race ring and by similarly bending the opposite end 7 of the outer race ring 3 toward the inner race ring 2. The race surfaces 5 and 5a are thus located opposite to each other in a line set angularly to the center of rotation of the bearing so as to form a conventional angular bearing. Between the ends of the bent edges 6 and 7 and the opposing cylindrical surfaces of the opposite bearings respectively a small gap is permitted to remain allowing the race rings to thus be movable radially as well as axially with respect to each other.

Figure 2:
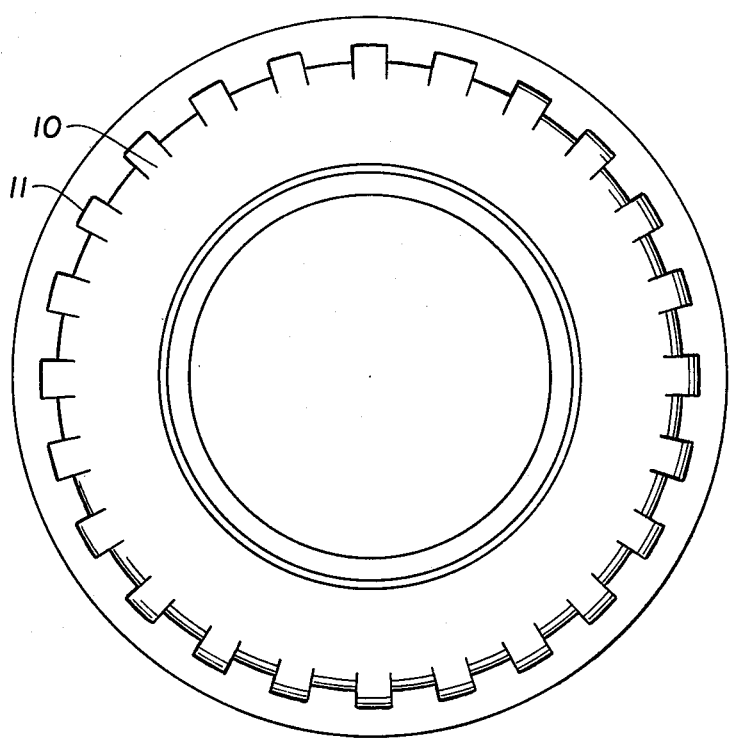
FIG. 2 is an end view of the bearing assembly according to FIG. 1 taken from the righthand side of FIG. 1.

One of the race rings, namely the outer race ring of the present embodiment is provided with an axially extending cylindrical portion 8 terminating in a radially outwardly directed flange 9 located about the outer surface of the cylindrical portion 8 is an annular elastic member 10 formed of a suitable plastic or rubber substance. The elastic member 10 has a relatively large thickness so as to form a good absorbing pad. The member 10 has on its peripheral surface a tooth or gearlike design pattern 11, as is clearly seen in FIG. 2 which enables it to be more easily grasped and to be more readily resilient. One end of the elastic member 10 is shaped so as to conform to the curvature of the bend in the race ring thereby overlap its corner. The other end of the elastic pad is adapted to abut against the radially extending flange 9.

The cylindrical portion of the outer race is provided with a plurality of holes 12. The holes 12 lie in a plane transverse to the axis of the bearing and in a position substantially adjacent to the outer surface of the radially bent portion 6 forming the race surface of the inner bearing 2. The annular elastic pad 10 is provided with a conforming number of lugs extending radially inward from their inner surface through the respective holes 12. Preferably the lugs 13 are integrally formed with the body of the annular elastic member 10. The radially inner ends 14 of the lugs 13 are enlarged and thickened to provide a head 14 similar to the design of a rivet. The heads 14 thus have a cross sectional area greater than that of the hole 12 so that they engage the inner surface of the outer ring 3 adjacent the edges of the holes 12. The projecting lugs 13 are of such a length that the heads 14 and the body of the annular elastic member 10 react against the surface of the race ring 3 so that the annular elastic member 10 is firmly held and clamped into position. Because of the elastic nature of the material this clamping action is secure and prevents inadvertent dislodgement of the annular member 10. However, it enables the easy removal of the member 10 by merely pulling and deforming on the head 14. The protruding head 14 of the lug 13 enters into the area or zone adjacent the outer surface 15 of the bent end 6 of the inner ring 2 so that it limits by engagement therewith the axial movement of the inner race ring 2 with respect to the outer race ring 3. The inner race ring may however be snapped over the head 14 into and out of assembly with the outer race ring 3.

The assembly of the bearing can be made in two ways. The annular elastic member 10 may be molded directly onto the outer surface of the outer race forming the lugs 13 and their heads 14 simultaneously through the holes 12. Thereafter the inner race ring 2 may be snapped over the lugs 13. In the other way first the inner race ring 2 and the outer race ring 3 are placed in position and a prefabricated annular elastic pad 10 is then slipped over the planar surface of the outer race ring 3. The lugs and their heads 14 having been previously formed with the annular member 10 are then sprung into the holes 12. In either event the annular elastic member 10 is firmly secured about the surface of the outer race ring 3 by the projections 13 which prevent its relative rotation or axial movement about the race ring.

It will be observed that a similar assembly can be made by enlarging the cylindrical surface of the inner race ring and providing the annular elastic member 10 internally of the inner race ring if desired. This is nothing but a reversal of the parts. It will be further obvious that the exact shape of the holes 12 and the heads 14 on the protruding lugs is a matter of design and while the circular form of the holes 12 and the type of rivet head 14 is preferred the conforming parts may be made ovally or of another shape.

The present construction, provides a simple and easily assembled bearing assembly which the annular elastic member provides not only a resilient interconnection between the inner and outer race rings but also a resilient absorbing pad between the bearing assembly and the motor vehicle in which it is installed. Various changes and modifications have been suggested, others will be obvious to those skilled in the present art. It is therefore intended that the present disclosure be illustrative only and not limiting of the scope of the invention.

What is claimed is:

1. A ball bearing assembly for a steering column comprising an outer ring and an inner ring inserted therein, said rings defining annular bearing surfaces for a plurality of ball bearings located therebetween, one of said rings having a plurality of holes spaced about its circumference, an annular elastic member located on the surface of said one ring, said elastic member having lugs extending through said holes adjacent the end of the other race ring to thereby connect said race rings.

2. The ball bearing assembly according to claim 1 wherein said elastic member is removable.

3. The ball bearing assembly according to claim 1 wherein said holes are round.

4. The ball bearing assembly according to claim 1 wherein said lugs are provided with enlarged ends in the form of rivet heads.

5. The ball bearing assembly comprising an outer race ring and an inner race ring loosely inserted therein, said race rings being bent along one end inwardly toward each other to define opposing race surfaces angular to the axis of rotation, one of said rings having a cylindrical portion extending axially from the race surface overlapping the bent end of the other race ring, a plurality of holes formed within said cylindrical portion and spaced about the circumference thereof, an annular elastic band located about said cylindrical portion, said band having projections extending through said holes into engagement with the bent end of said other race ring.

6. The bearing assembly according to claim 5 wherein said elastic band and said projections are integrally molded.

7. The bearing assembly according to claim 5 wherein said elastic band and said projections are integrally molded in situ about said one race ring.

8. The bearing assembly according to claim 5 wherein said outer ring is provided with an extending cylindrical portion and said elastic band surrounds the outer surface of said outer race ring.

9. The bearing assembly according to claim 5 wherein the outer surface of said band is provided with radially extending projections.

* * * * *